(12) United States Patent
Hoge et al.

(10) Patent No.: US 6,508,428 B2
(45) Date of Patent: Jan. 21, 2003

(54) MULTI-PURPOSE WIDE MEDIA CARTRIDGES AND CARTRIDGE CHASSIS SUBASSEMBLIES

(75) Inventors: David T. Hoge, Westminster, CO (US); Stephen Stamm, Fort Lupton, CO (US); George A. Saliba, Northboro, MA (US)

(73) Assignee: Quantum Coprporation, Milpitas, CA (US)

( * ) Notice: Subject to any disclaimer, the term of this patent is extended or adjusted under 35 U.S.C. 154(b) by 0 days.

(21) Appl. No.: 09/918,149

(22) Filed: Jul. 30, 2001

(65) Prior Publication Data

US 2002/0053619 A1 May 9, 2002

Related U.S. Application Data

(63) Continuation-in-part of application No. 09/440,459, filed on Nov. 15, 1999, now Pat. No. 6,267,313.
(60) Provisional application No. 60/247,405, filed on Nov. 10, 2000.

(51) Int. Cl.[7] ............................................... G03B 23/02
(52) U.S. Cl. ....................................... 242/345; 360/132
(58) Field of Search .............................. 242/345, 345.1, 242/345.2, 335; 360/132

(56) References Cited

U.S. PATENT DOCUMENTS

| 367,176 | A | * | 7/1887 | Barker |
| 487,520 | A | * | 12/1892 | Gillette |
| 695,639 | A | * | 3/1902 | Goerz |
| 3,677,487 | A | * | 7/1972 | Knowles et al. |
| 4,019,695 | A | * | 4/1977 | Wharam |
| 5,497,955 | A | * | 3/1996 | Angellotti et al. |
| 5,620,265 | A | * | 4/1997 | Kondo |
| 6,089,767 | A | * | 7/2000 | Martinez et al. |
| 6,267,313 | B1 | * | 7/2000 | Saliba et al. |

* cited by examiner

Primary Examiner—William A. Rivera
(74) Attorney, Agent, or Firm—Fish & Richardson P.C.

(57) ABSTRACT

A universal tape path subassembly that forms a data storage tape supply and path and fits within tape cartridge housings of varying form factors. The universal subassembly includes registration datum features and surfaces that can be made accessible externally to a tape cartridge (containing the tape path subassembly) for aligning the tape path subassembly relative to a drive unit adapted to receive the tape cartridge.

11 Claims, 11 Drawing Sheets

MULTI-PURPOSE WIDE MEDIA CARTRIDGES AND CARTRIDGE CHASSIS SUBASSEMBLIES

CROSS REFERENCE TO RELATED APPLICATIONS

This application is a continuation-in-part of U.S. patent application Ser. No. 09/440,459, filed Nov. 15, 1999, now U.S. Pat. No. 6,267,313 and claims priority from U.S. Provisional Patent Application Ser. No. 60/247,405, filed Nov. 10, 2000, both of which are incorporated herein by reference in their entirety for all purposes.

This application is related to co-pending U.S. patent application Ser. No. 09/577,637, filed May 24, 2000, which is incorporated herein by reference in its entirety for all purposes.

BACKGROUND OF THE INVENTION

The present invention relates to data storage devices and more particularly to tape storage devices using a wide tape cartridge.

Various types of tape cartridges are known in the art. One common type of tape cartridge includes a plastic box containing a feed reel for feeding a supply of magnetic tape spooled thereon, and a take-up reel for collecting the spooled tape from the feed reel after the tape has passed by an externally mounted write/read head assembly. Another type includes a plastic box containing a single feed reel having an end with a tape buckling mechanism for buckling onto a leader and then being drawn along a tape path within a tape drive. The latter type has typically employed one-half inch wide magnetic tape, and has been widely and successfully marketed under the Quantum DLT brand.

SUMMARY OF THE INVENTION

In one aspect of the invention, a universal tape path subassembly includes a chassis and a tape transport structure coupled to and supported by the chassis. Together, the chassis and tape transport structure form a data storage tape supply and path for use with tape cartridge housings of differing form factors.

Particular implementations of the invention may provide one or more of the following advantages.

The universal tape path subassembly can be used in different tape cartridges regardless of the external form factors of the tape cartridges. Moreover, the universal transport assembly can contain and use wide magnetic recording tape within a variety of tape cartridges having exterior form factors equivalent to, and compatible with, existing tape cartridge libraries and gripper-picker handling devices and systems.

In addition, precision registration datum points on the universal tape path subassembly and exposed by the housing can be used to ensure that the subassembly is in a correct position for accurately reading and writing on media. A tape drive transport can therefore be designed to accommodate these features instead of using the sides of the cartridge housing as is customary. These features and registration points can be standardized between different drive and cartridge manufacturers, enabling interchangeability with different styles and capacity cartridges.

Other features and advantages of the invention will be apparent from the following detailed description and from the claims.

DETAILED DESCRIPTION

Figure 1:
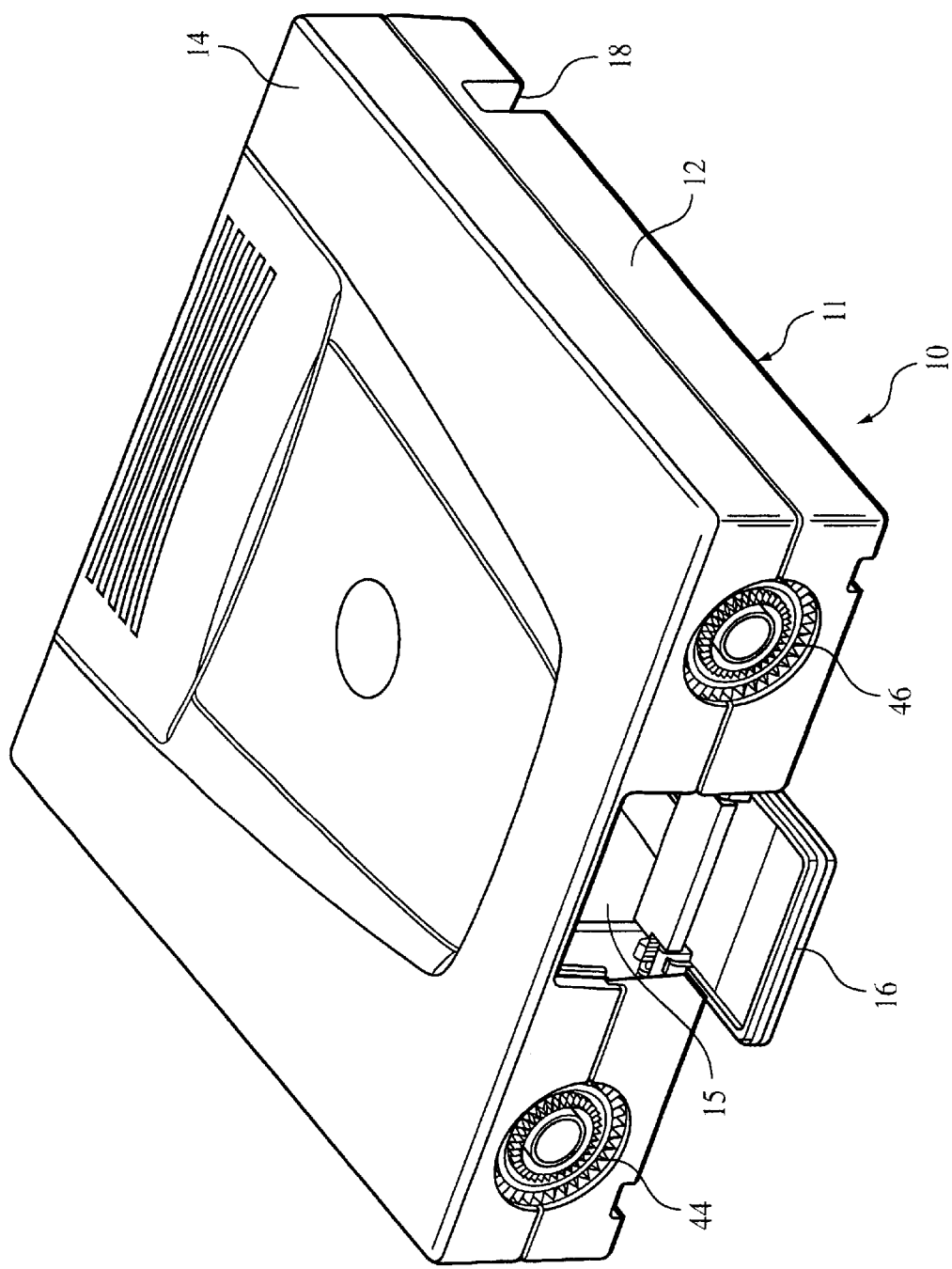
FIG. 1 is an isometric top view of a wide tape cartridge.
Figure 2:
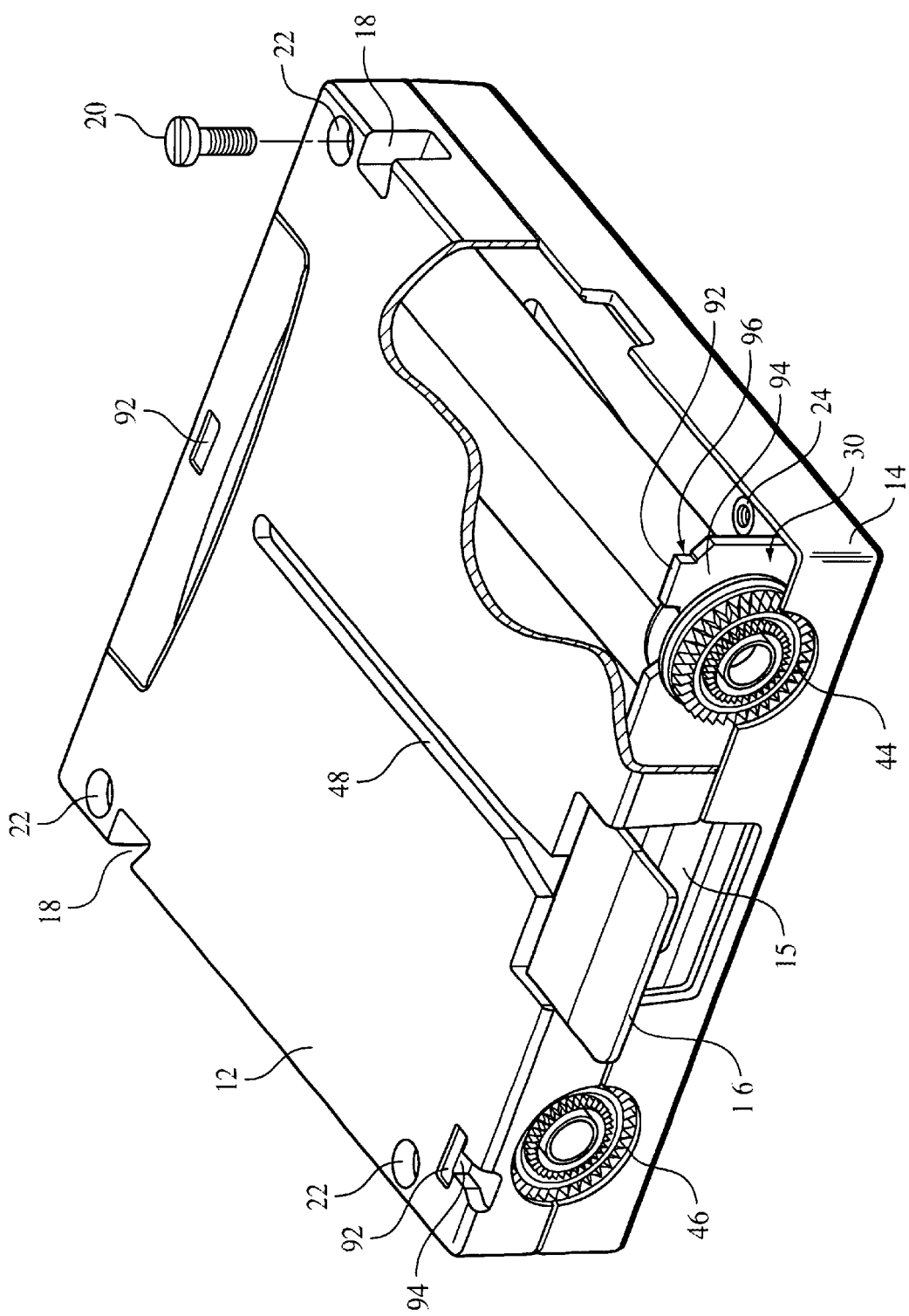
FIG. 2 is an isometric cut-away bottom view of a wide tape cartridge shown in FIG. 1

Referring to FIGS. 1–2, a tape cartridge 10 includes a housing 11 having a lower housing member 12, an upper housing member 14 and a head access opening 15 adapted to receive a head actuator (not shown). The access opening 15 may be closeable with an access door 16. The tape cartridge 10 includes a number of cartridge identification and registration features, such as one or more or interposer notches 18 and a write-protect tab (not shown). The upper housing member 14 may be secured to the lower housing member 12, for example, mechanically through snap-in connections with fasteners 20 which may be conventional screws, rivets and the like. In one practice, the upper housing 14 may include a number of holes 22 mating with respective screw bosses 24 or holes provided on the lower housing 12 and adapted to receive fasteners 20 for connecting the upper housing member 14 to the lower housing member 12. Alternatively, or in addition, the upper and lower housing member may also be joined using an adhesive or by a welding process, or by other processes known in the art.

Figure 3:
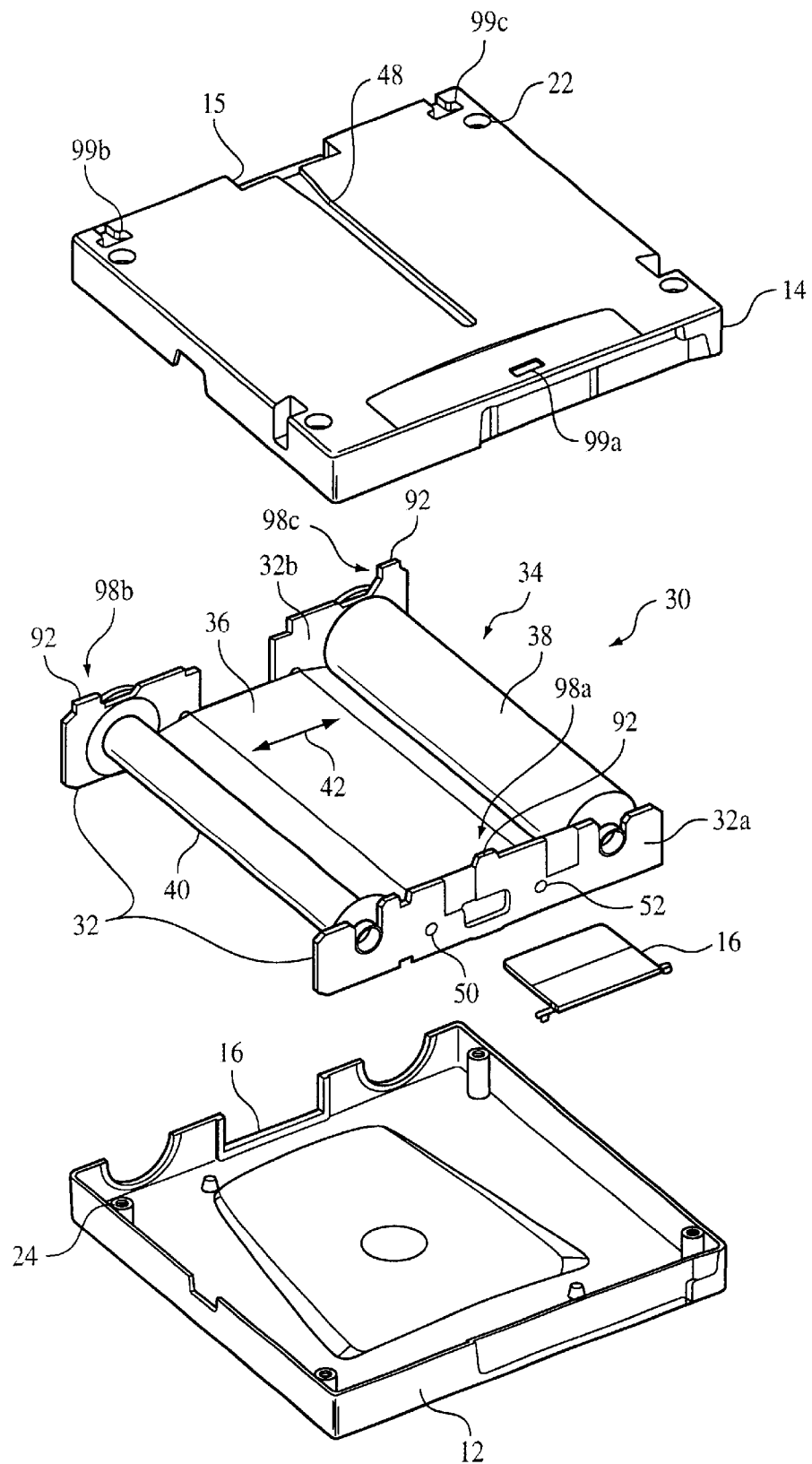
FIG. 3 is an exploded view of the wide tape cartridge of FIGS. 1–2 showing a universal tape path subassembly housed within.

As seen in FIGS. 2 and 3, the upper and lower housing members 12, 14 enclose a tape path subassembly 30. The tape path subassembly 30 includes a chassis 32 (having side members 32a, 32b) and a tape transport structure or mechanism 34 that is coupled to the chassis 32. The tape transport structure 34 supports a wide tape 36 having a width of, for example, approximately 3½ inches. The tape transport structure 34 further includes a supply reel 38 and a take-up reel 40. The tape 36 may be initially wound on the supply reel 38, with the free end of the tape 36 to be wound onto the take-up reel 40 to transport the tape 36 in a transport direction indicated by the arrow 42. Preferably, the chassis 32 is a precision chassis formed of a suitable rigid material such as plastic or metal. The tape reels 38, 40 are mounted on ball bearings (not shown), which provide journals between the reels 38, 40 and the chassis 32, and have integrated flanges that hold the tape 36 in place during operation and prevent unwanted side-to-side motion of the tape 36.

The reels 38, 40 are supported for rotation by the chassis 32 and have respective drive gears (or sockets) 44, 46 adapted to engage with respective motor driven couplings of a tape drive (not shown) for transporting the tape 36 in the longitudinal transport direction. Typically, one reel 38 or 40 may be driven by a drive motor, and the other reel 40, 38 braked, under the control of a drive motor controller. The drive gears are rigidly mounted to the reels, preferably along a common edge of the chassis 32 as shown in FIG. 3. Also attached to each gear 44, 46 is a spring-loaded brake mechanism that locks each reel from rotating whenever a cartridge including the subassembly 30 is unloaded from/external to a drive apparatus. The top and bottom portion of the cartridge 10 may have a key, such as an exemplary transverse slot 48 located on the lower housing member 12 to ensure proper insertion and guiding of the cartridge relative to a head assembly of a tape drive within which the cartridge 10 is employed. Tape guides 50, 52 are positioned between the reels 38, 40 to define a reference plane of the tape 36 so that a head assembly can be inserted into the opening 15 for travel between the chassis side members 32a and 32b of the tape path subassembly.

In one embodiment, as shown in FIG. 3, the chassis 32 is a formed metal part that holds the two tape reels 38, 40 in precise position by virtue of aligned slots machined in the chassis side members 32a, 32b. The slots hold the reels and thus the tape path of the tape transport structure 34 precisely parallel to each other, thereby ensuring smooth operation of the tape path.

Figure 4:
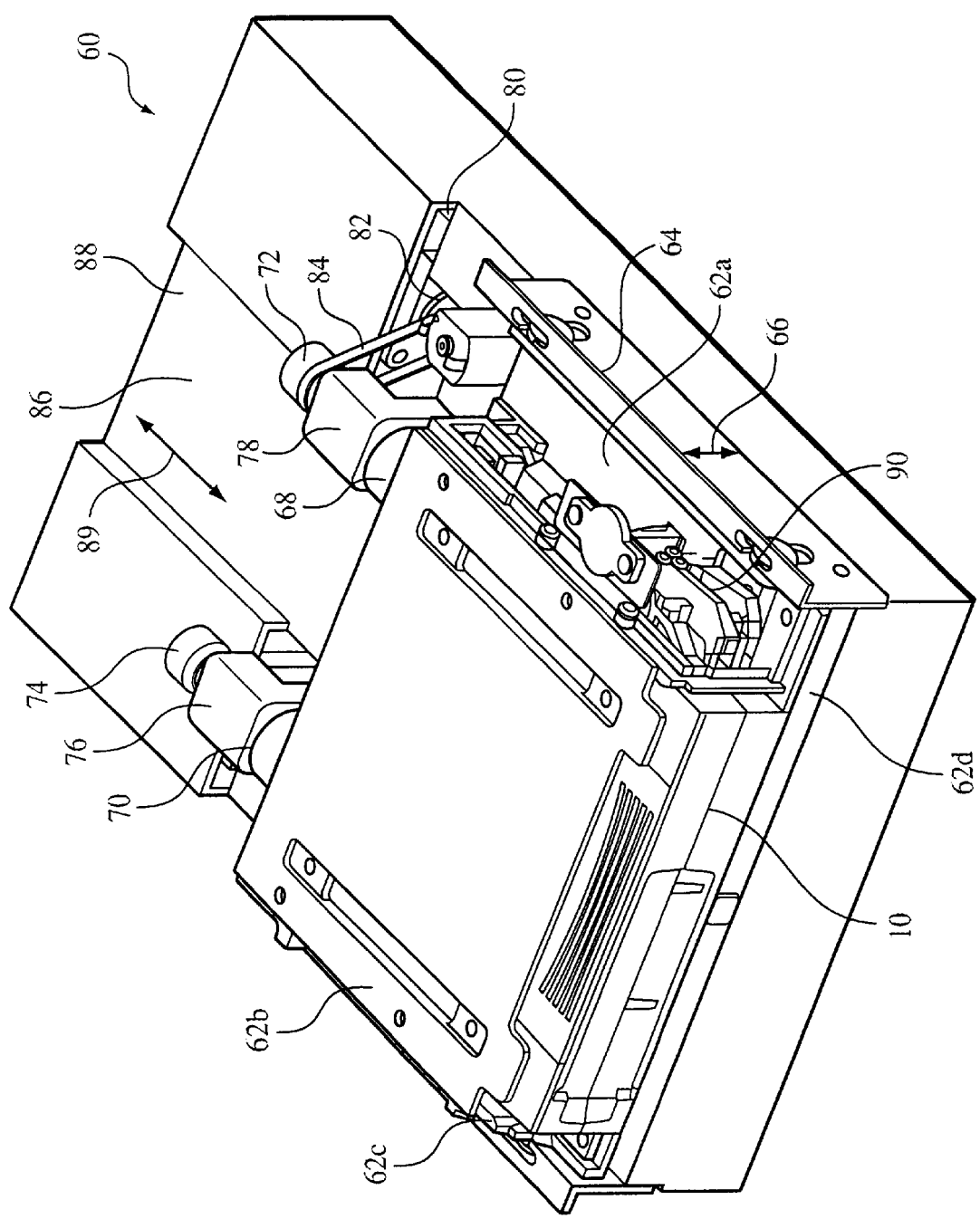
FIG. 4 is a top view of a tape drive assembly for the wide tape cartridge of FIGS. 1–3.

Referring now to FIGS. 3 and 4, the cartridge 10 is shown inserted into a tape slot of a tape drive assembly 60. The cartridge 10 is enclosed by a platform 62a, top cover 62b and side covers 62c and 62d. The platform 62a is attached to a cartridge lift mechanism 64 which can raise and lower the platform 62a and thereby also the cartridge 10 with respect to the chassis of the drive assembly 60 in a vertical direction indicated by the arrow 66. The tape drive assembly 60 further includes drive couplings 68, 70 which are adapted to engage with the respective drive sockets 44, 46 to rotate the tape reels 38, 40. Each of the drive couplings is secured together with a respective drive pulley 72, 74 on a common drive shaft (not shown) which is rotatably mounted in bearing supports 76, 78 secured to the drive assembly. Drive motors 80 having motor pulleys 82 are mounted on the assembly 60. The motor pulleys may be coupled to the drive pulleys via conventional belts 84. Other force-transmitting mechanisms, such as friction or toothed gears, may also be used. The cartridge lift mechanism 64 may be driven by a motor and a geared transmission or by other lifting mechanism known in the art. A head actuator (not shown) for actuating a head assembly attached thereto may also be mounted, for example, a surface 88 on the assembly 60. The head actuator moves the head assembly bi-directionally in a direction indicated by arrow 89. A head assembly enters the tape cartridge 10 through the opening 15. A head actuator may be operated, for example, by a motor and/or a voice coil mechanism which provides coarse and/or fine positioning of the head assembly. The drive assembly 60 may also include a cartridge receiver mechanism 90 for sensing the presence and possibly also information about the type of a cartridge 10 in the drive assembly 60 as well as for opening the door 16 and locking the cartridge 10 in place.

The location of the tape path subassembly 30 and therefore also the tape 36 relative to the tape cartridge housing 11 may be subject to, among others, manufacturing tolerances. To provide a more precise registration between the tape 36 and a drive assembly chassis and thereby also a head assembly chassis, the tape path subassembly may be supported in the drive assembly 60 on datum surfaces 92, 94, 96 (of registration datum features or points 98) which are accessible from outside the tape cartridge housing. In the exemplary tape cartridge 10 of FIGS. 2 and 3, features are arranged essentially coplanar with a major surface of the lower housing member 12 and define a horizontal reference plane for aligning the tape cartridge 10 vertically relative to a drive chassis 60. Additional datum surfaces engaging with reference surfaces located on the drive assembly chassis 60 may be used for registering the tape path subassembly 30 in the horizontal reference plane.

Referring to FIGS. 2–3, in the embodiment illustrated, there are three features 98, which are formed on the chassis 32, one on side member 32a (feature 98a) and the other two on side member 32b (features 98b and 98c). Each of the features 98a, 98b and 98c includes a respective primary registration datum surface 92. The features 98b and 98c on the side member 32b also include a respective secondary registration datum surface 94. The feature 98b on the side member 32b also includes a tertiary registration datum surface 96. Thus, the subassembly 10 is registered precisely along x, y and z axes of the drive apparatus 60. These datum features align the complete assembly to corresponding features in the drive apparatus. This precision arrangement ensures that the subassembly 10 is in a correct position for accurately reading and writing on the wide tape 36. The features 98a, 98b and 98c are exposed to a tape drive assembly in which the subassembly 30 resides via corresponding openings 99a, 99b and 99c in the lower housing member 12. In the embodiment shown, the openings 99b and 99c are "T" shaped openings which enable contact with the features 98b and 98c, respectively, on different surfaces of those features.

Figure 5:
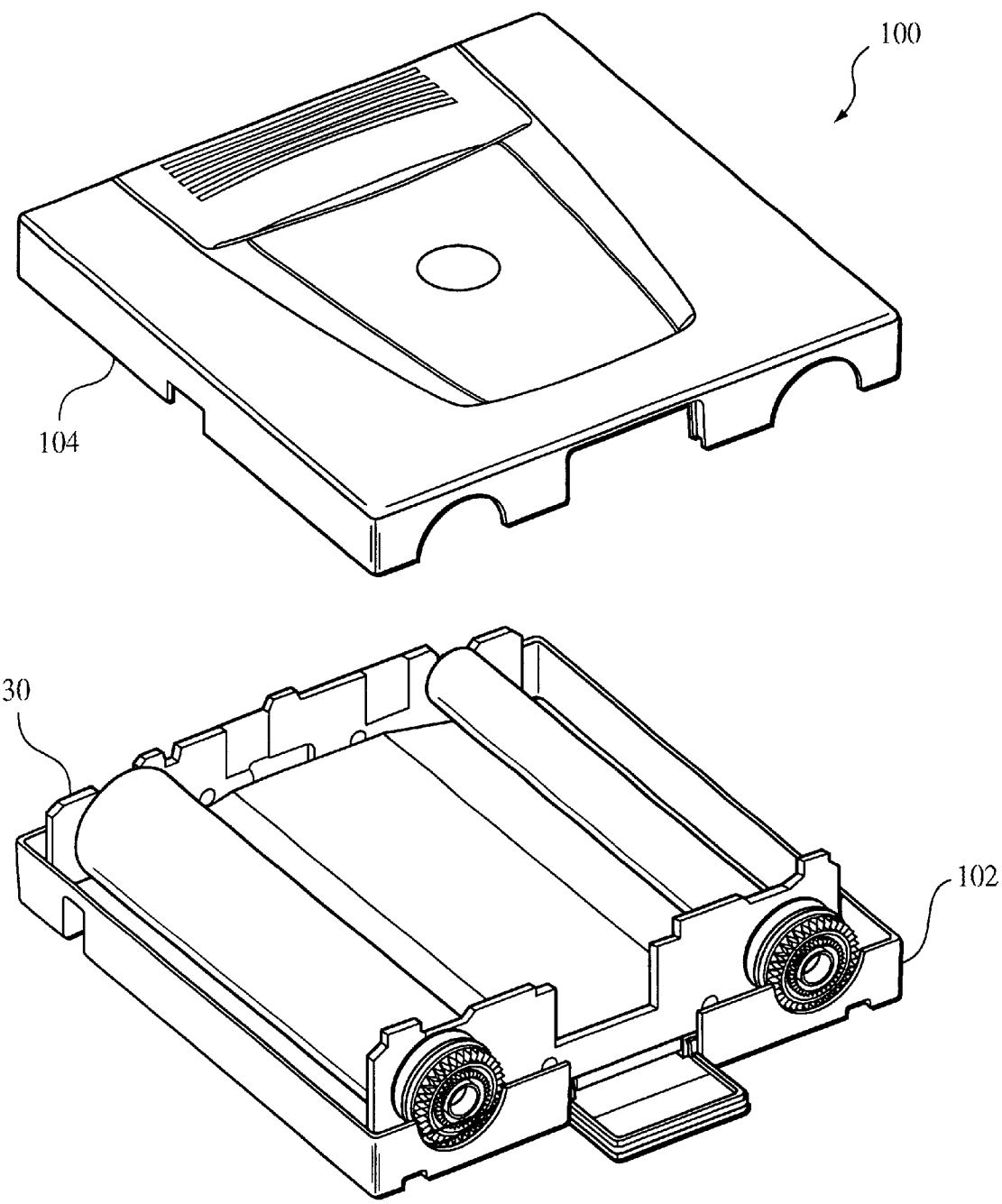
FIG. 5 is an exploded isometric view of a wide tape cartridge subassembly within a DLT-style tape cartridge and form factor.
Figure 6:
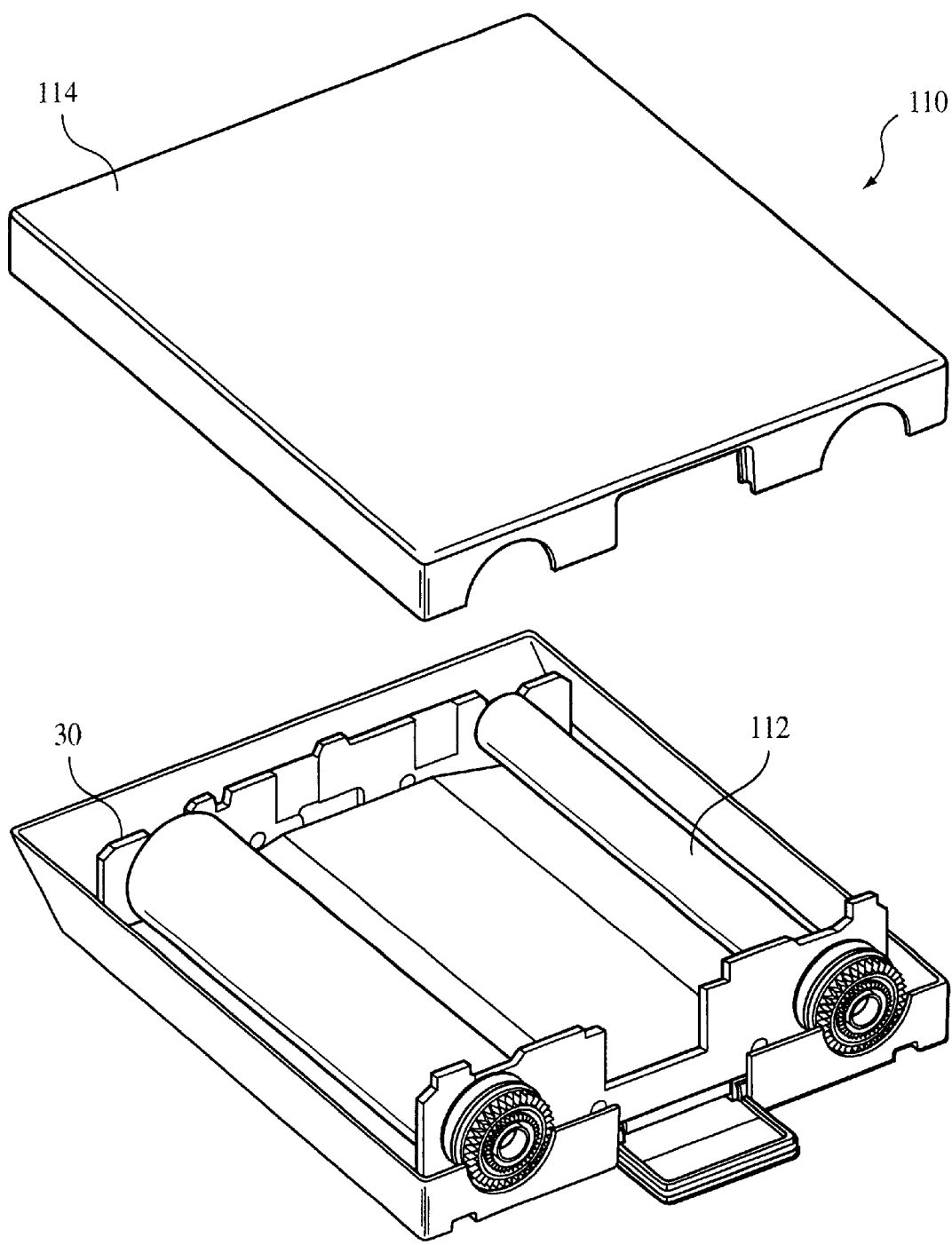
FIG. 6 is an exploded isometric view of a wide tape cartridge subassembly within an IBM 3480-style tape cartridge and form factor.

FIG. 5 illustrates the tape path subassembly 30 inserted into a digital linear tape (DLT) type plastic enclosure 100 that includes a base 102 and cover 104. The enclosure 100 is similar in design to the enclosure 11 shown in FIGS. 1–3. FIG. 6 illustrates the tape path subassembly 10 inserted into an IBM 3480 style tape cartridge 110 that includes a base 112 and cover 114. The DLT style enclosure 100 and the IBM 3480 style enclosure 110 are notably different in external form factor, with the IBM 3480 style cartridge 110 being longer and wider, and with the DLT style cartridge 100 being thicker. With the universal tape path subassembly 10 as thus described and assuming both enclosures 100 and 110 are designed to expose the registration features of the subassembly 10, the enclosure form factors are irrelevant beyond the exposed datum surfaces (92, 94, 96) and features 98 (shown in FIGS. 2 and 3). A tape drive transport can therefore be designed to accommodate these features, eliminating the need to use the sides of the cartridge enclosure (for purposes of registration). These features and registration points can be standardized between different drive and cartridge manufacturers, enabling interchangeability with different styles and capacity cartridges.

Figure 7:
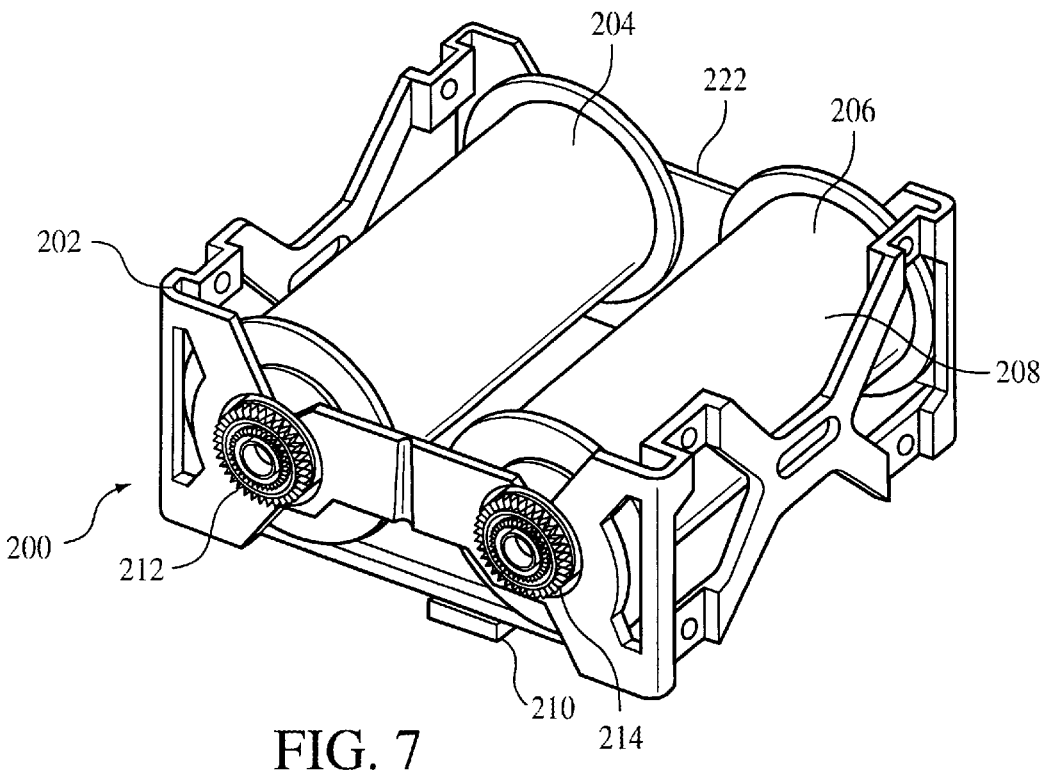
FIG. 7 is an isometric top view of a tape path subassembly in accordance with a second embodiment, similar to the FIG. 3 embodiment, with an extended height dimension to enable a greater supply of data storage tape to be stored and transported.

FIG. 7 illustrates an alternative embodiment 200 of a wide tape path subassembly. The subassembly 200 includes a formed metal precision chassis 202, flanged tape reels 204 and 206, wide magnetic tape 208, an access door 210, a feed reel gear 212, a take-up reel gear 214, a feed reel brake 216 and a take-up reel brake 218. As shown in the figure, the formed metal chassis 202 is most preferably an open truss-like structure that provides suitable strength and rigidity while using a minimum of metal, thereby reducing weight. As formed, the subassembly 200 has a form factor suitable for inclusion within a standard width and depth DLT tape cartridge housing, but requires an extended height dimension to enable a larger diameter supply of storage tape to be spooled on reels 204 and 206 and transported therebetween.

Figure 8:
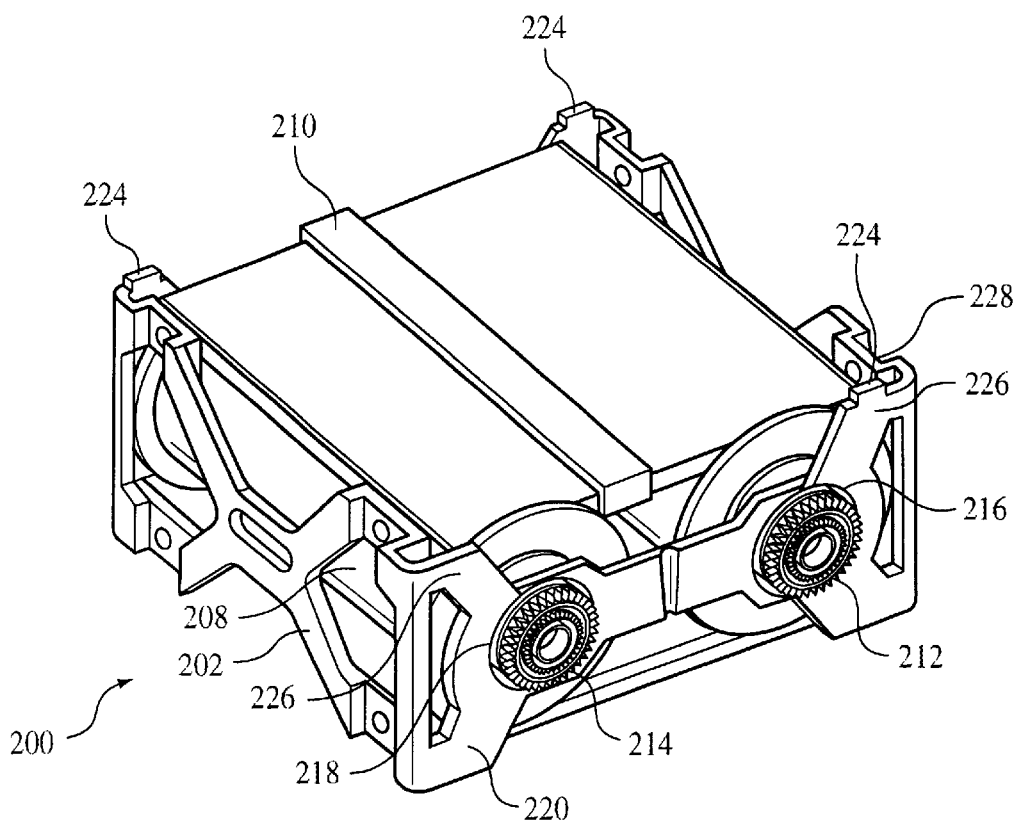
FIG. 8 is an isometric bottom view of the FIG. 7 subassembly.

As with the subassembly 10, the chassis 202 holds the two tape reels 204 and 206 in accurate position by means of slots machined in chassis endwall portions 220 and 222. The slots hold the reels and thus the tape path precisely parallel to each other, ensuring smooth operation of the tape path. Also located with great precision to the reel slots are registration features and datum surfaces, as shown in FIG. 8. In FIG. 8, primary registration points 224, secondary registration points 226, and at least one tertiary registration point 228 (like the surfaces or points 92, 94, 96 of features 98 shown in FIG. 3) provide datum surfaces and features for registering the subassembly 200 with the drive mechanism.

The tape reels 204 and 206 are most preferably mounted on ball bearings. The tape reels 204 and 206 have integrated flanges that hold the magnetic media 208 in place during tape travel operations and prevent undesirable side-to-side motion of the tape. Each drive gear 212, 214 is rigidly attached to its corresponding tape reel 204, 206, and mates with an aligned, complementary gear provided in the drive mechanism. A motor in the drive mechanism rotates one of the reels acting as a tape pickup reel, while another motor in the drive mechanism brakes the feed reel under control of a motors controller operating in a manner well known in the tape transport art. Attached to each drive gear 212, 214 is a brake mechanism 216, 218 which locks the associated reel from inadvertent rotation when a cartridge including the subassembly 200 is removed from the tape drive unit. Most preferably, each brake mechanism is actuated when the door 210 is slid to an open position which occurs when the subassembly (and cartridge) are fully loaded into a tape drive unit.

Figure 9:
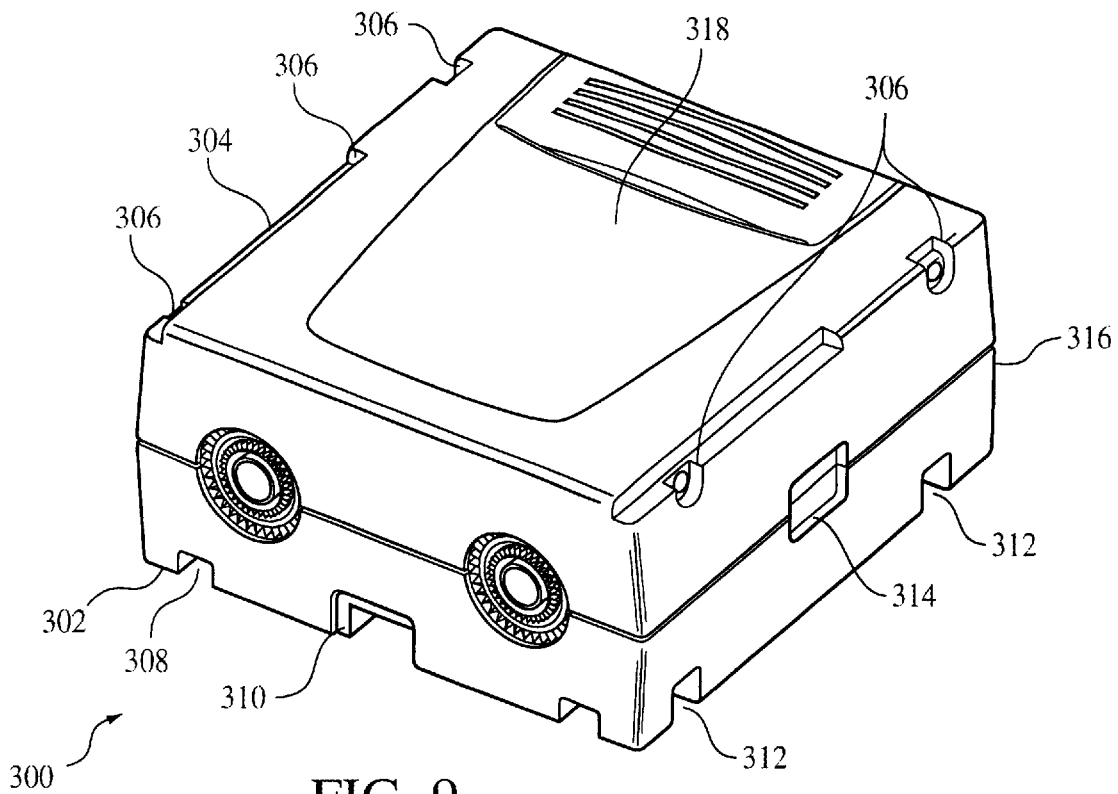
FIG. 9 is an isometric top-front view of a media cartridge including the FIG. 7 subassembly.
Figure 10:
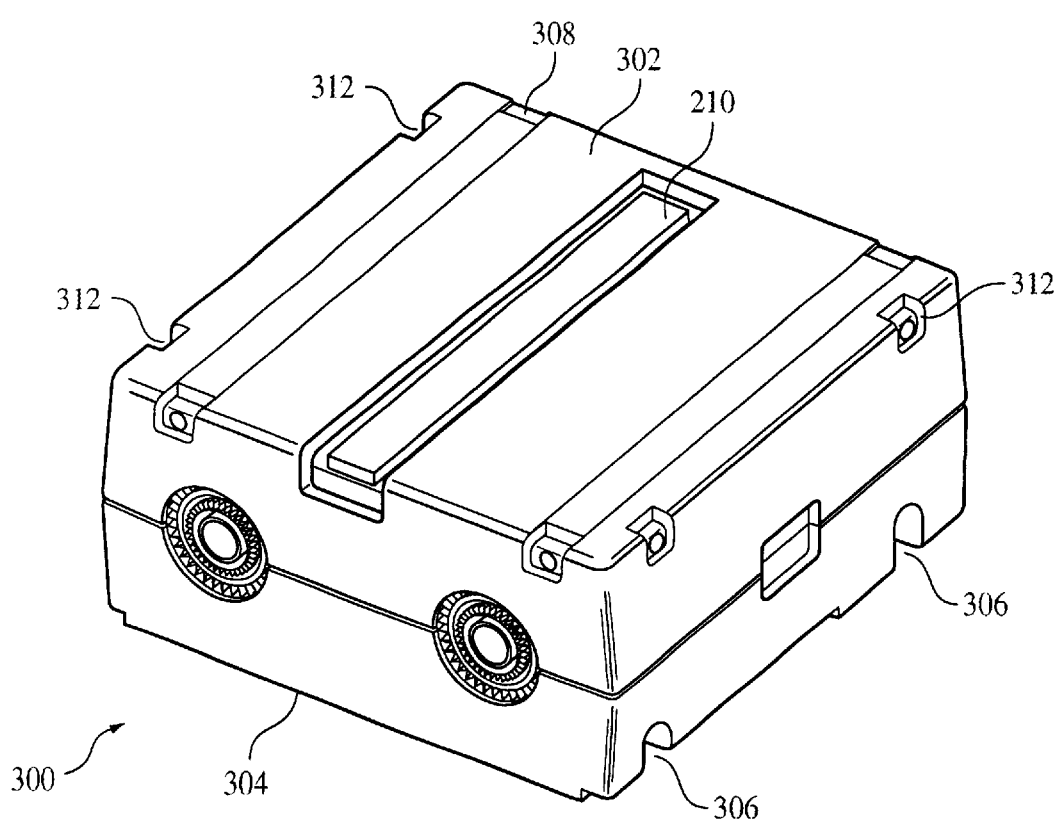
FIG. 10 is an isometric bottom-rear view of the FIG. 9 media cartridge.
Figure 11:
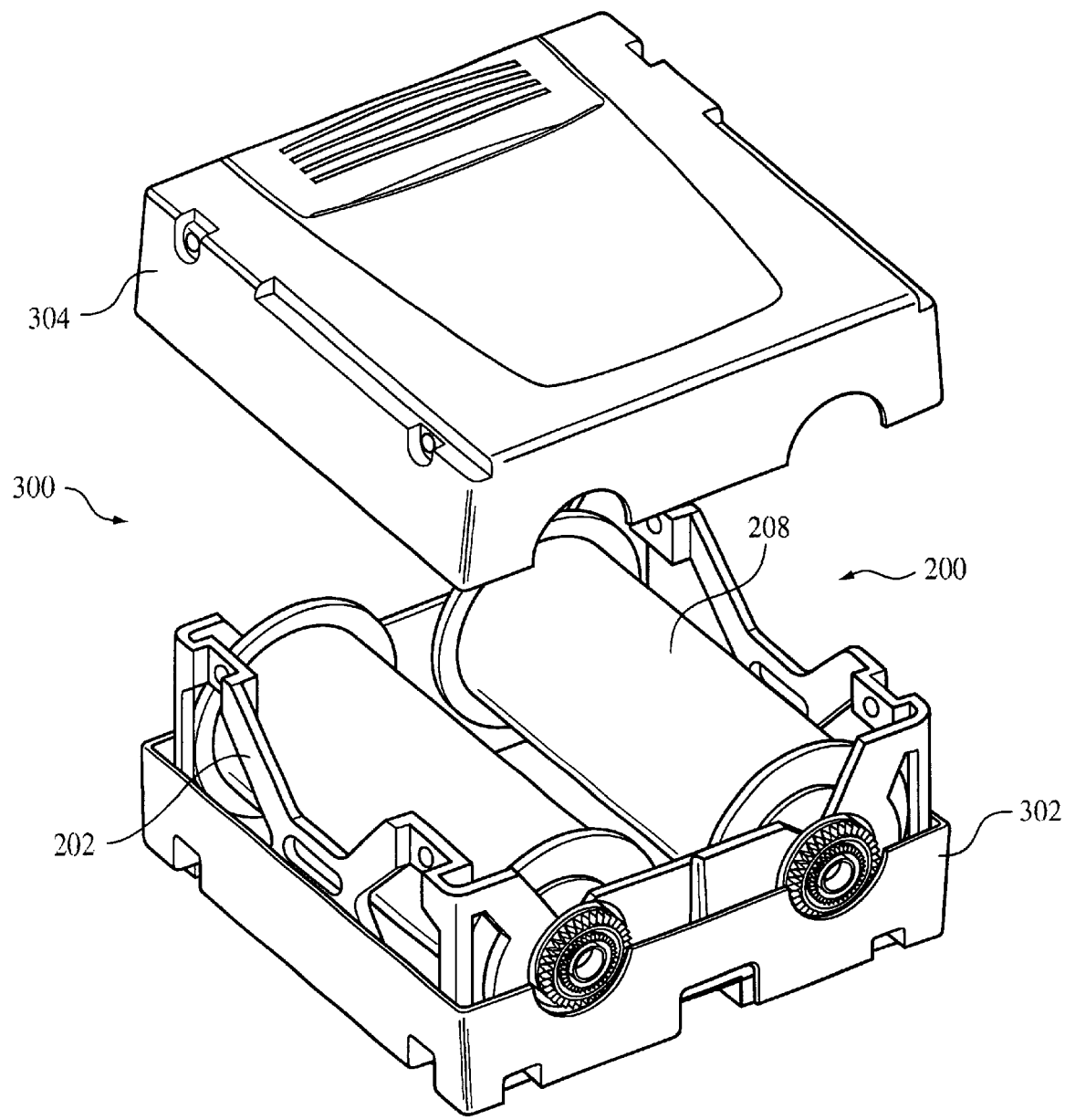
FIG. 11 is an exploded isometric view of the FIG. 9 media cartridge in a DLT-style tape cartridge.
Figure 12B:
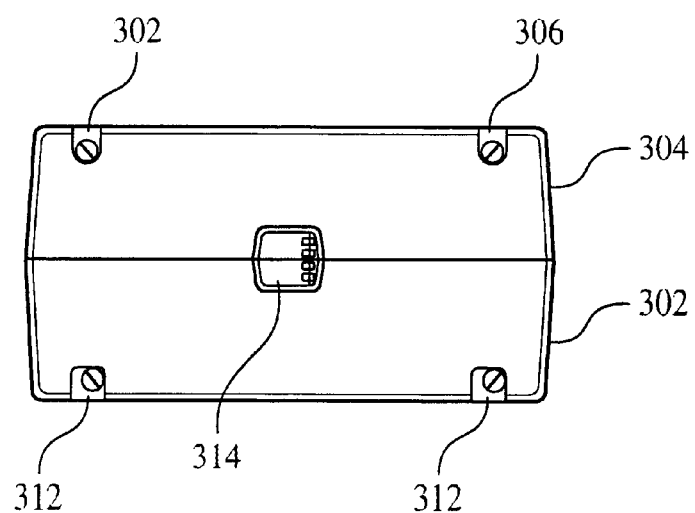
FIG. 12B is a right side elevational view.
Figure 12A:
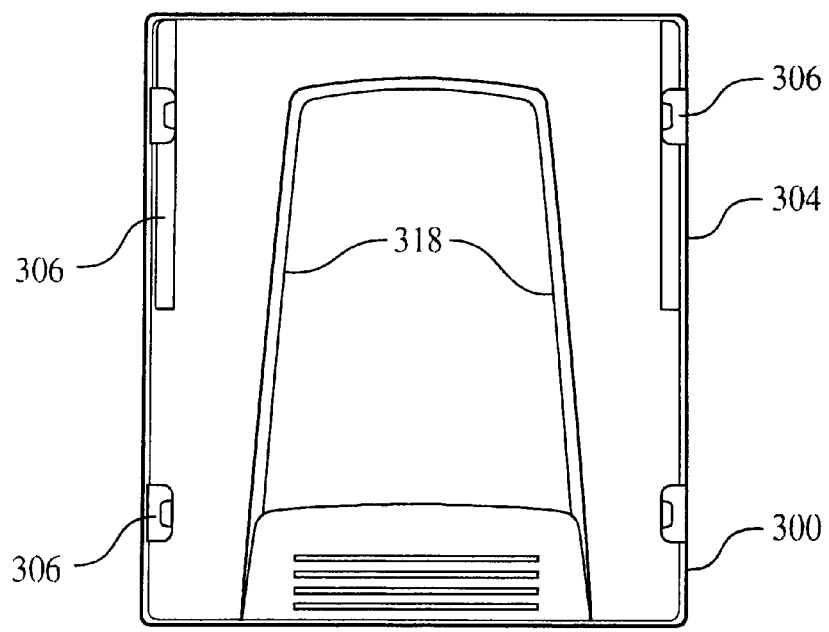
FIG. 12A is a top plan view.
Figure 12C:
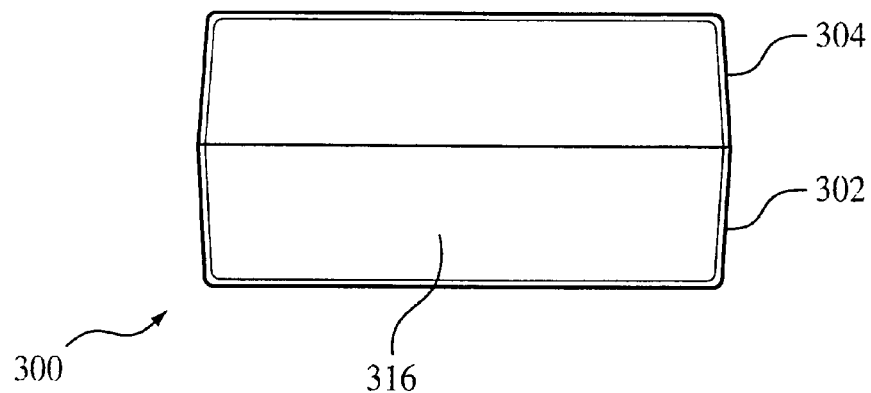
FIG. 12C is a rear elevational view.
Figure 12D:
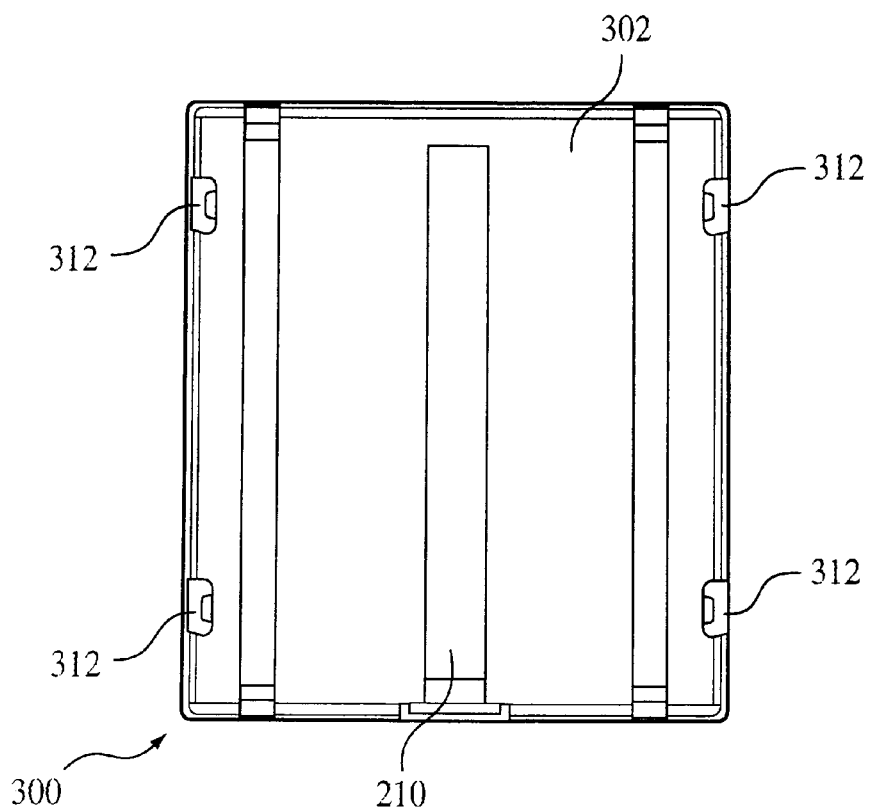
FIG. 12D is bottom plan view, of the FIG. 9 media cartridge.

FIGS. 9, 10 and 11 show the subassembly 200 being inserted into a DLT-style plastic tape cartridge 300. The cartridge 300 includes a base 302 and a cover 304. As shown in FIG. 9, the cartridge 300 includes a series of drive orientation notches 306, drive registration datum points 308, a door assembly 310 cooperating with door 210, a set of drive docking notches 312, a write protect switch 314, a bar code label area 316, and a manufacturer's brand/label area 318. The write protect switch can be moved to enable or disable the ability of the drive unit to write onto the magnetic media 208 within the cartridge 300. The bar code label area provides a standardized location for bar codes of the type that is automatically scanned by a tape cartridge library system to identify each cartridge. The manufacturers' label area enables the cartridge manufacturer to install a desired identification label or logo. The drive orientation notches are used by the drive unit to grab hold of the cartridge 300 and force it downwards into a fully loaded position within the tape drive. They also provide a "flipped notch" function to prevent the cartridge 300 from being inserted upside down into the drive unit and thereby protect the fragile head components of the drive unit from being damaged. The drive registration features are most preferably exposed metal features of the chassis 202 which protrude from the cartridge enclosure 300. These features are precisely machined and establish accurate reference datum points for head assembly positioning and also ensure that the cartridge is aligned repeatably inside the drive unit for accurate media interchange, as mentioned above. The drive docking notches are used by the drive unit and other robotic tape cartridge handling mechanisms to securely grip and manipulate the cartridge 300. FIGS. 12A, 12B, 12C and 12D show other views of the cartridge 300. FIG. 12A is a top plan view and FIG. 12D is a bottom plan view. FIGS. 12B and 12C provide a right side elevational view and a rear elevational view, respectively.

Other embodiments are within the scope of the following claims. For example, although only DLT and 3480 style cartridges have been described herein, it will be understood that the universal subassembly could also be used with other cartridge styles, such as Linear Tape-Open (LTO), as well.

What is claimed is:

1. A universal tape path subassembly, comprising:
    a chassis;
    a tape transport structure coupled to and supported by the chassis, the chassis and tape transport structure together forming a data storage tape supply and path for use with tape cartridge housings of differing form factors; and
    registration features which align the tape path subassembly with a tape drive adapted to receive a tape cartridge housing and the tape path subassembly.

2. The universal tape path subassembly of claim 1, wherein the registration features are formed on the chassis and are exposed through openings in the tape cartridge housing when the chassis is positioned within the tape cartridge housing.

3. The universal tape path subassembly of claim 2, wherein the registration features enable alignment with the tape drive along x-, y- and z-axes.

4. The universal tape path subassembly of claim 1, wherein the tape transport structure includes dual reels positioned along a major dimension of such tape cartridge housings.

5. The universal tape path subassembly of claim 1, wherein the tape transport structure includes at least one reel, the reel extending substantially across a major dimension of such tape cartridge housings and supporting a wide format storage tape.

6. The universal tape path subassembly set forth in claim 5, wherein the tape comprises a wide format magnetic data storage tape.

7. The universal tape path subassembly of claim 1, wherein one of the differing form factors comprises a digital linear tape (DLT) tape cartridge form factor.

8. The universal tape path subassembly of claim 1, wherein one of the differing form factors comprises a form factor other than a DLT tape cartridge form factor.

9. The universal tape path subassembly of claim 8, wherein the form factor is that of a Linear Tape-Open (LTO) style tape cartridge.

10. A tape cartridge for a magnetic recording tape, comprising:
    a housing; and
    a tape path subassembly enclosed within the housing, the tape path subassembly having registration features that are exposed through openings in the housing and serve to align the tape path subassembly with a tape drive adapted to receive the housing and tape path subassembly.

11. The tape cartridge of claim 10, wherein the tape cartridge housing includes reference features enabling engagement, transport and handling of the tape cartridge incident to automatic loading into, and unloading from, a tape drive adapted to receive the tape cartridge housing and tape path subassembly.

* * * * *